J. F. RISDON.
FISH HOOK EXTRACTOR.
APPLICATION FILED JAN. 18, 1911.
1,043,627.
Patented Nov. 5, 1912.
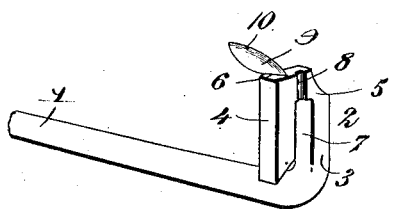
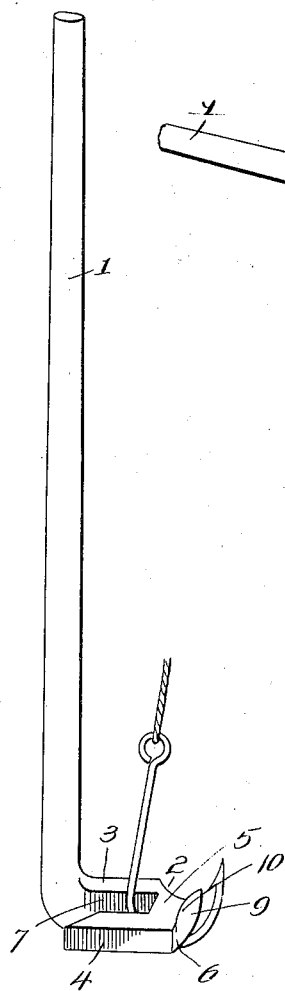

ated from each other and formed to provide a passage 7 which opens at one end di-

UNITED STATES PATENT OFFICE.

JOHN F. RISDON, OF DENT, MINNESOTA.

FISH-HOOK EXTRACTOR.

1,043,627. Specification of Letters Patent. Patented Nov. 5, 1912.

Application filed January 18, 1911. Serial No. 603,338.

*To all whom it may concern:*

Be it known that I, JOHN F. RISDON, a citizen of the United States of America, residing at Dent, in the county of Ottertail and State of Minnesota, have invented new and useful Improvements in Fish-Hook Extractors, of which the following is a specification.

This invention relates to fish hook extractors, and has for an object to provide an article of this character including an extracting element and a cutting element, the former being adapted to be engaged with the shank of the hook and being wholly carried by the cutting element so that on movement of the extracting element into the mouth of the fish the cutting element will be brought into action to cut those tissues of the mouth to which the barb of the hook is engaged and anchored.

Another object of the invention is to provide in the construction means for guiding the extracting element on the hook so as to provide for the positive and exact movement of the cutting element of the device to the desired point in the mouth of the fish with respect to the point of the hook.

In the drawing, forming a portion of this specification and in which like numerals of reference indicate similar parts in the several views:—Figure 1 is a perspective view of the fish hook extractor showing the application of the same to a fish hook. Fig. 2 is an inverted perspective view of the extracting element and the cutting element.

My improved fish hook extractor is preferably formed from a single bar of steel or other suitable metal or material that may be found best adapted for the purpose intended. The bar herein employed is formed to provide a handle or shank 1 which is relatively long. At one end the shank is formed to provide an extracting element 2 which comprises the spaced parallel portions 3 and 4 which are connected with each other by the supporting portion 5 of the cutting element 6. The portions 3 and 4 of the extracting element are separated from each other and formed to provide a passage 7 which opens at one end directly at one side of the shank 1 for a purpose to be hereinafter described.

The portion 5 is formed on its underside to provide a guiding groove 8 which opens at one end directly onto the cutting blade 9. The blade 9 is provided with a relatively sharp cutting edge 10 which extends transversely across the upper surface of the portion 5 and suitably projecting above the plane of the portion 5 and disposed preferably at right angles thereto. The blade 9 as herein shown, is an integral part of the portion 5, but as will be understood, it may be made separate therefrom and welded or otherwise suitably secured thereto.

In operation of the extractor, the extracting and cutting element portions are inserted into the mouth of the fish and arranged therein so that the portions 3 and 4 straddle the shank of the hook, as shown in Fig. 1 of the drawing. After the extractor has been arranged with the hook as just described, it may be manipulated to cause the curved portion of the hook to be engaged in the groove 8 in the under surface of the portion 5 so that in further manipulation of the extractor and on movement of the same in the direction of the barb of the hook or point thereof the blade 9 will be moved in cutting proximity with those tissues of the mouth in which the barb of the hook is anchored. In this operation it will be seen that the tissues of the mouth will be cut sufficiently to release the barb of the hook, after which the handle or shank 1 of the extractor may be drawn outwardly and the hook will be carried therewith.

I claim:—

1. A fish hook extractor comprising a member having an extracting element thereon, the said extracting element comprising spaced side portions and a connecting end portion, the said connecting portion having a groove therein on one of its surfaces, and a cutting blade extending transversely to the plane of the groove and wholly supported by the extracting element.

2. A fish hook extractor comprising a member formed at one end to provide spaced parallel portions connected with each other at one end, and a transversely extending cutting blade at the connected ends of the said spaced portions.

3. A fish hook extractor comprising a member having spaced parallel portions connected together at one end, and a cutting blade supported by the connecting portion of the said member, the said connecting portion having a groove therein at one side of the blade.

In testimony whereof I affix my signature in presence of two witnesses.

JOHN F. RISDON.

Witnesses:
   Edw. Stoll,
   J. B. Risdon.